Patented May 5, 1925.

1,536,099

UNITED STATES PATENT OFFICE.

HENRY G. JAEGER, OF ROSE HILL, CALIFORNIA, ASSIGNOR OF ONE-FOURTH TO EVERETT R. LAMBERTSON AND ONE-FOURTH TO GEORGE P. CLEMENTS, BOTH OF EAGLE ROCK CITY, CALIFORNIA, AND ONE-FOURTH TO JULIUS SCHNEIDER, OF LOS ANGELES, CALIFORNIA.

PROCESS OF PREPARING A DECORATIVE FACING.

No Drawing.   Application filed October 4, 1922.   Serial No. 592,419.

*To all whom it may concern:*

Be it known that I, HENRY GEORGE JAEGER, a citizen of the United States, residing at Rose Hill, in the county of Los Angeles and State of California, have invented new and useful Improvements in a Process of Preparing a Decorative Facing, of which the following is a specification.

My present invention relates to a decorative facing and process of producing the same, one object of my invention being the production of a facing which can be modified to imitate leather, and which can be otherwise variously treated to produce ornamental effects of exceptional beauty and durability.

Another object of my invention is the production of surfaces or effects of the character referred to by simple means and by the use of such ingredients as shall render the same waterproof and permanent even when employed in situations where they must be exposed to the elements or subjected to the action of soap and water in cleansing.

In the practice of my invention, I prefer to prepare separately a liquid mixture and a mixture of powders, these two mixtures to be thereafter combined into a putty-like mass suitable to be applied with a trowel and thereafter modified to produce a desired artistic effect. The parts referred to below are by weight.

For my liquid mixture I prefer to use one part spirits of turpentine, one part japan drier, one part of a rubbing varnish, and one part boiled linseed oil, these to be thoroughly mixed together. For my mixture of powders, I prefer to employ two parts of powdered silica passing two hundred meshes to the inch, two parts of short fiber asbestos, four parts dry white lead, these also to be thoroughly mixed together, and then combined with the mentioned liquid mixture in the manner indicated above.

The above preparation may then be applied to any desired basic material, it being important to observe, however, that the basic material should have been thoroughly cured or freed from moisture, any porous material also being sized with any suitable sizing and permitted to dry before my composition is applied. The composition above described is then applied to a thickness of one-sixteenth of an inch or less and permitted to remain undisturbed until a film-like surface hardening shall have taken place, after which it may advantageously be dusted with a powdery material such as talcum, in preparation for a subsequent treatment to produce decorative effects. To produce leather-like wrinkles in a surface as prepared above, I have found it a simple and satisfactory procedure to crush a linen towel in the hand and press it lightly on the surface, changing the grip of the towel with each application. The impressions left on the surface when this procedure is followed will be found to resemble old leather wrinkles, and satisfactory variation may be obtained by changing the pressure or shape of the towel. Other desirable effects may be obtained by using a sponge, excelsior, a brush, a Turkish towel, or any similar instrument as a means of impression. Mosaics, tile effects, figures or conventional designs of any desired character may be impressed upon the surface when in the condition above described.

After the putty-like material has been allowed sufficient time to become thoroughly dry throughout, any excess of talcum may be removed, and color effects may be obtained by use of a desired pigment stain. Beautiful high lights may be produced, and the much-admired smoky leather effects seen on the walls of old European castles may be perfectly imitated. Delicate artistic tints, suitable for the most elegant boudoirs, can be produced.

While I have above set forth in detail and by way of example only one specific embodiment of my invention, it should be understood that various features thereof may be used independently, and various modifications may be made by those skilled in the art without departing from the spirit and scope of my invention as indicated above and set forth in the appended claims.

I claim as my invention:

1. A process of producing decorative surfaces which comprises preparing a liquid mixture of turpentine, japan drier, varnish, and linseed oil, separately preparing a powdery mixture of silica, short fiber asbestos, and dry white lead, associating the mentioned mixtures in such proportions as to produce a plastic mass, applying said mass to a surface to be coated, permitting a surface hardening to take place, dusting an inert powdery material thereon, and then producing desired irregularities in the surface so prepared.

2. The process of preparing a decorative surface which comprises preparing a liquid mixture, separately preparing a powdery mixture, preparing a plastic mass by associating these mixtures, applying the plastic mass as a coating material, permitting a surface hardening to take place, dusting a powdery material thereon, forming irregularities in the surface so dusted, permitting the surface to dry further, removing any excess of the powdery material, and applying any desired color thereto.

3. A process of preparing decorative surfaces which comprises preparing a plastic mass, applying said mass to a surface to be decorated, permitting a surface hardening to take place, dusting a powdery material thereon, forming irregularities in the surface so dusted, permitting the surface to dry further, removing any excess of the powdery material, and applying any desired color thereon.

In testimony whereof I have signed my name to this specification.

H. G. JAEGER.